US011875352B2

(12) United States Patent
Ahuja

(10) Patent No.: US 11,875,352 B2

(45) Date of Patent: Jan. 16, 2024

(54) DYNAMIC AUTHENTICATION THROUGH USER INFORMATION AND INTENT

(71) Applicant: PAYPAL, INC., San Jose, CA (US)

(72) Inventor: Sumeet Ahuja, Milpitas, CA (US)

(73) Assignee: PAYPAL, INC., San Jose, CA (US)

( * ) Notice: Subject to any disclaimer, the term of this patent is extended or adjusted under 35 U.S.C. 154(b) by 192 days.

(21) Appl. No.: 17/317,147

(22) Filed: May 11, 2021

(65) Prior Publication Data

US 2021/0406898 A1 Dec. 30, 2021

Related U.S. Application Data

(63) Continuation of application No. 16/107,977, filed on Aug. 21, 2018, now Pat. No. 11,004,081, which is a continuation of application No. 14/586,881, filed on Dec. 30, 2014, now Pat. No. 10,055,736.

(51) Int. Cl.
*G06Q 20/40* (2012.01)

(52) U.S. Cl.
CPC ... *G06Q 20/4016* (2013.01); *G06Q 20/40145* (2013.01)

(58) Field of Classification Search
CPC ........... G06Q 20/0453; G06Q 20/3674; G06Q 30/0251; G06Q 30/06
See application file for complete search history.

(56) References Cited

U.S. PATENT DOCUMENTS 8,666,841 B1 * 3/2014 Claridge ................ G06Q 30/00 705/26.1
9,189,788 B1 * 11/2015 Robinson ......... G06Q 20/40145
10,467,604 B1 * 11/2019 Dorsch ................... G07F 19/20
2008/0052180 A1 2/2008 Lawhorn
2009/0106034 A1 4/2009 Giacalone et al.
2012/0323717 A1 * 12/2012 Kirsch ............... G06Q 20/3829 705/26.1
2013/0006860 A1 1/2013 Balasubramanian et al.
2013/0102283 A1 4/2013 Lau et al.
2013/0275273 A1 10/2013 Champlin et al.
2014/0058949 A1 2/2014 Ciurea
2014/0344109 A1 11/2014 Prindle

OTHER PUBLICATIONS

International Appl. No. PCT/US2015/063290, International Search Report and Written Opinion dated Feb. 12, 2016, 8 pages.

* cited by examiner

*Primary Examiner* — Scott S Trotter
(74) *Attorney, Agent, or Firm* — Haynes and Boone, LLP

(57) ABSTRACT

There are provided systems and methods for dynamic authentication through user information and intent. A user may wish to purchase an item that they view on a merchant marketplace using a computer of mobile phone. The merchant for the merchant marketplace may register the user's intent to purchase the item by receiving the user's actions while browsing the marketplace. The user may further provide user information with the merchant, such as a biometric reading, identifier, or other information. When the user then arrives at a merchant location to purchase the item and complete a transaction using a payment instrument, the merchant may process the user's intent and information to determine how confident the merchant is that the user is entitled to utilize the payment method. Such confidence rating may correspond to whether the merchant believes the transaction is fraudulent or if the user is misrepresenting their identity.

20 Claims, 6 Drawing Sheets

DYNAMIC AUTHENTICATION THROUGH USER INFORMATION AND INTENT

CROSS REFERENCE TO RELATED APPLICATIONS

This application is a continuation of U.S. patent application Ser. No. 16/107,977 filed Aug. 21, 2018, now U.S. Pat. No. 11,004,081, which is a continuation of U.S. patent application Ser. No. 14/586,881 filed on Dec. 30, 2014, now U.S. Pat. No. 10,055,736, the content of which are hereby incorporated by reference in their entirety for all purposes.

TECHNICAL FIELD

The present disclosure generally relates to dynamic authentication through user information and intent, and more particularly, to authenticating a user in a transaction dynamically so that proper authentication for a transaction is based on merchant confidence in the identity of the user.

BACKGROUND

A user, such as a consumer, may wish to purchase an item and make a trip to a merchant location to purchase the item. During checkout of the item, however, the user may be required to go through an arduous process of providing sufficient information to the merchant to verify the user's identity and protect the merchant from fraud. This may be especially noticeable in the case of large expenses. While both the merchant and user may wish to streamline the process, the merchant may have policies requiring the most recent customer information and have a high degree of confidence in the validity of the transaction. Thus, the user may be required to submit new information, review old information, and/or complete a lengthy checkout processes. However, users would prefer to provide the least amount of information the least number of times, as well as not being required to explicitly provide such information. This causes authentication and identification processes of the merchant to be at odds with the desires of the user, leading to a less desirable purchasing experience.

Figure 1:
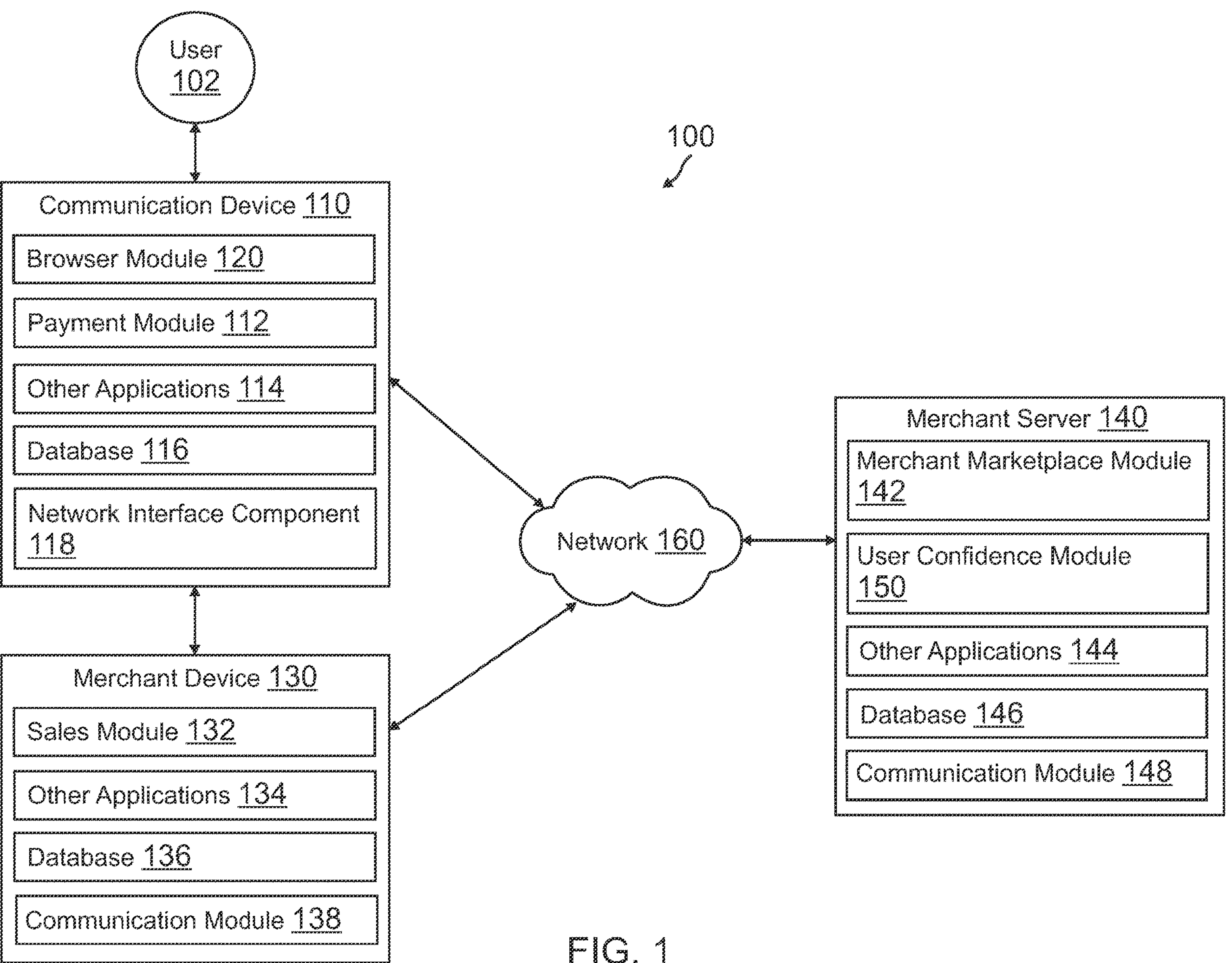
FIG. 1 is a block diagram of a networked system suitable for implementing the processes described herein, according to an embodiment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Provided are methods that provide for communication device interfaces for transaction approval at a merchant location. Systems suitable for practicing methods of the present disclosure are also provided.

A user may view items on a merchant marketplace, such as an online marketplace offered through a merchant or third party website and/or available through a merchant application. While viewing the item, the merchant may register the user's intent to purchase the item, for example, by virtue of the user viewing the item, through input from the user, and/or through other indicators provided by the user. For example, an indicator may include a search of the item on the merchant marketplace, a selection of the item on an interface for the merchant marketplace, a reservation of the item with a merchant location associated with the merchant marketplace, a digital shopping cart for the merchant marketplace comprising the item, a wish list for the merchant marketplace comprising the item, and/or a time for pickup of the item by the user at the merchant location. The user may also provide user information to the merchant with the indicator or the merchant may access a user account to retrieve the user information. The user information may correspond to a login, a personal identifier number (PIN), a password, a biometric reading/input (e.g., a retinal image/scan, fingerprint, DNA sample, breathalyzer, heartbeat reading, facial image, or other biometric reading), a location for the user (e.g., GPS coordinates of the user, which may be utilized with a user account to determine if the user is at a home address), user and/or device identifiers, and/or network access/connection information (e.g., an IP address).

The merchant may then receive the indication and the information about the user to determine what authentication is required by the user when a transaction for the item is initiated at a merchant location. The transaction may include a payment instrument (e.g., a credit/debit/gift card or other payment card, a bank account, and/or a payment account with a payment provider) for the user. Thus, the merchant may wish to determine a confidence rating the merchant has in the transaction. The confidence rating may correspond to a numerical score, threshold requirement, or other determination associated with how likely a person initiating the transaction is the user and not a fraudulent party. The confidence rating may also be associated with potential risk for the merchant by engaging in the transaction, such as risk of fraud and/or misrepresentation of identity. Thus, the confidence rating may correspond to what authentication may be required by the party engaging in the transaction to verify and identify the user and the party engaging in the transaction. A high confidence rating (e.g., a high score or score over a particular threshold set by the merchant and/or a payment provider/card issuer that processes payment for the transaction) may determine that during checkout, authentication/identification may not be required, may be minimal (e.g., display of the physical payment card, a driver's license, etc.), reduced from a normal level, or otherwise altered to streamline the payment process and provide expedited checkout. However, a low confidence rating may correspond to indicators of fraud and the merchant may require normal amounts of identification/authentication, increased identification/authentication of a standard level set by the merchant, and/or may prevent the transaction from proceeding and payment being processed.

The merchant may dynamically determine the required authentication/identification using the confidence rating. To determine the confidence rating, the merchant may process the user's indicator and information to determine if signs of fraud are present (e.g., past fraudulent transactions, account warnings, suspicious behavior such as expensive and atypical items, etc.). The merchant may process the indication and/or information with the purchase request for the transaction to determine the confidence rating. For example, if the user registers intent to purchase an item and reserves the item for pick up two hours later, the merchant receiving a purchase request for the same item two hours later using the user's payment instrument may determine a high confidence rating through the matching information. The user may provide a biometric at the time of registering the indication to purchase the item and provide the biometric on checkout at the merchant location. Biometrics may include eye/retinal images/scans, fingerprint scans, heartbeat monitoring, etc. In various embodiments, biometrics may also be utilized to determine whether a user is more likely fraudulent, such as increased heart rate and/or perspiration when conducting a transaction at a merchant location over their biometric at a home location (e.g., when the intent to engage in the transaction was detected). Moreover, the merchant may receive further indications and/or information from the user from the time of registering intent to purchase the item to the time of providing the purchase request for the item at the merchant location. The further indications/information may correspond to accrued information about the user, such as further biometrics, GPS locations of the user, WiFi or other network connections of the user (e.g., at the merchant location) or other information that may be utilized to determine behavior of the user and whether the behavior of the user deviates from the initial indicator/information. For example, if the user's location is detected as at a home location when initially forming the intent to purchase an item, GPS coordinates showing the user's communication device as at the home location and/or travelling from the home location to the merchant location may indicate that the purchase request is submitted by the user. Conversely, if the user's communication device connects to a WiFi router at a different location than the home location, the merchant may determine another user is attempting to create a fraudulent transaction.

FIG. 1 is a block diagram of a networked system 100 suitable for implementing the processes described herein, according to an embodiment. As shown, system 100 may comprise or implement a plurality of devices, servers, and/or software components that operate to perform various methodologies in accordance with the described embodiments. Exemplary device and servers may include device, stand-alone, and enterprise-class servers, operating an OS such as a MICROSOFT® OS, a UNIX® OS, a LINUX® OS, or other suitable device and/or server based OS. It can be appreciated that the devices and/or servers illustrated in FIG. 1 may be deployed in other ways and that the operations performed and/or the services provided by such devices and/or servers may be combined or separated for a given embodiment and may be performed by a greater number or fewer number of devices and/or servers. One or more devices and/or servers may be operated and/or maintained by the same or different entities.

System 100 includes a user 102, a communication device 110, a merchant device 130, and merchant server 140 in communication over a network 160. User 102, such as a consumer, may utilize communication device 110 to browse a marketplace and submit an intent to purchase an item available on the marketplace with merchant server 140. User 102 may later visit a merchant location corresponding to merchant device 130 in order to purchase the item. Merchant server 140 may receive a purchase request for the item, such as a transaction having the item. Merchant server 140 may determine a confidence rating in the transaction, where the confidence rating is associated with how likely the purchase request is initiated by user 102. Merchant server 140 may then determine required authentication for user 102 when providing payment for the purchase request to merchant device 130.

Communication device 110, merchant device 130, and merchant server 140 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 160.

Communication device 110 may be implemented using any appropriate hardware and software configured for wired and/or wireless communication with merchant device 130 and/or merchant server 140. For example, in one embodiment, communication device 110 may be implemented as a personal computer (PC), a smart phone, laptop computer, wristwatch with appropriate computer hardware resources, eyeglasses with appropriate computer hardware (e.g. GOOGLE GLASS®) and/or other types of computing devices capable of transmitting and/or receiving data, such as an IPAD® from APPLE®. Although a communication device is shown, the communication device may be managed or controlled by any suitable processing device. Although only one communication device is shown, a plurality of communication devices may function similarly.

Communication device 110 of FIG. 1 contains a browser module 120, a payment module 112, other applications 114, a database 116, and a communication module 118. Browser module 120, payment module 112, and other applications 114 may correspond to processes, procedures, and/or applications, for example, a software program, executable by a hardware processor. In other embodiments, communication device 110 may include additional or different modules having specialized hardware and/or software as required.

Browser module 120 may correspond to one or more processes to execute modules and associated specialized hardware of communication device 110 to browse one or more items on a merchant marketplace for a merchant associated with merchant device 130 and merchant server 140. In this regard, browser module 120 may correspond to specialized hardware and/or software used to receive input correspond to at least one item user 102 has viewed and intends to purchase. Thus, browser module 120 may be used, for example, to provide a convenient interface to permit user 102 to select the item(s) for viewing or enter input correspond to the item(s) (e.g., search of the item on the marketplace or the search server, a selection of the item on an interface for the item, placing the item into a wish list or digital shopping cart, or other action that corresponds to a desire or intent by user 102 to purchase the item). In various embodiments, browser module may receive text input and/or selections using a computer peripheral (e.g., a keyboard, mouse, etc.). Additionally, browser module 120 may receive an image, scan, or other input for an item and/or code of the item (e.g., an alphanumeric, bar, and/or QR code). Browser module 120 may utilize such information to search for the item, reserve the item, and/or otherwise register an intent by user 102 to purchase the item.

Browser module 120 may correspond to a browser application or dedicated merchant application for the merchant associated with merchant device 130 and merchant server 140. Thus, browser module 120 may allow user 102 to browse the Internet, including navigation to websites and between webpages of websites. In such embodiments, browser module 120 may therefore be configured to transmit and receive information, such as webpage requests, input to webpages, downloads and uploads of data, such as data in database 116 of user device 110, etc. Thus, browser module 120 may be used to access a website corresponding to merchant device 130 and/or merchant server 140 to view and select one or more items from the merchant marketplace. In doing so, merchant server 140 may receive user 102's desire/intent to purchase the item(s). Thus, browser module 120 may be utilized to provide an indication that user 102 intends to purchase the item(s). In other embodiments, browser module 120 may correspond to a dedicated application for merchant device 130, such as a merchant specific application (e.g., a marketplace application specific to merchant device 130), where user 102 may view items available from merchant device 130 to purchase. Using browser module 120, user 102 may request the aforementioned item information. The item information may include a name, description, and/or price of the item. The item information may further include a review of the item, contents of the item (including ingredients), services offered by or with the item, or further item information. Item information may be saved to a database, such as database 116, where the item information may be accessed by a module (e.g., payment module 112 and/or sales module 132) and to initiate a purchase request for the item while user 102 is at a merchant location.

Browser module 120 may also be utilized to provide information to merchant server 140 for use in identifying user 102. Such information may correspond to user personal information, a login to a user account, a PIN or password used to identify user 102, personal and/or device identifiers for user 102 and/or communication device 110, and/or biometric input/readings for user 102. The information may be submitted prior to providing the indication that user 102 intends to purchase an item. The information may also be provided when user 102 generates the indication or may be provided after user 102 generates the indication. Browser module 120 may also receive further indications and/or information for user 102 and provide the indications/information to merchant server 140 for determination of a confidence rating, as discussed herein.

Payment module 112 may correspond to one or more processes to execute modules and associated specialized hardware of communication device 110 to generate a transaction having a purchase request for one or more items for purchase and/or communicate the purchase request to merchant device 130. In this regard, payment module 112 may correspond to specialized hardware and/or software that user 102 may utilize to have user 104 (e.g., a payer) pay for the item(s). In generating a purchase request, user 102 may enter a selection of items, such as through an input device of communication device 110. The selection of items may include one or more items for purchase from the merchant associated with merchant device 130. As previously discussed, an item may be entered and/or selected through an image or scan of the item/item code or through selection in a merchant application/website. The item may also be entered by user 102 and/or the merchant at the merchant's location. For example, user 102 may pick up the item(s) and bring the item(s) to a checkout counter. Once the selection of item(s) is entered by user 102, payment module 112 may determine the purchase request for the item(s). In various embodiments, payment module 112 may instead be utilized to communicate a payment instrument to merchant device 130 to utilize in a purchase request for the item. Merchant device 130 may process the purchase request using the payment instrument in order to receive payment for purchase of the item.

Thus, payment module 112 may be used, for example, to provide a convenient interface to permit user 102 to select payment options for payment instruments and provide payment for items and/or services. Such payment instruments may include a payment account as well as credit/debit/gift cards and/or bank accounts. For example, payment module 112 may be implemented as an application having a user interface enabling the user to enter payment options for storage by communication device 110, provide payment to merchant device 130, and complete a transaction for the items using the aforementioned payment instrument. In certain embodiments, payment module 112 may correspond more generally to a web browser configured to view information available over the Internet or access a website corresponding to a payment provider. Thus, after acceptance of all or part of the transaction/items available in the transaction, user 102 may complete payment for the transaction using payment module 112.

Once user 102 is ready to complete the transaction, payment module 120 may receive a request for authentication and/or identification required to complete the transaction and processes payment using the payment instrument in the purchase request. In other embodiments, a merchant or merchant employee at a merchant location for the merchant associated with merchant device 130 and merchant server 140 may request the authentication and/or identification from user 102 (e.g., a driver's license, payment card, biometric, password, etc.). Thus, user 102 may provide the authentication and/or identification to a device or accessory at the merchant location (e.g., a fingerprint or retina scanner connected to merchant device 130, a keypad, etc.). The authentication and/or identification required may be based on the confidence rating determining using user 102's indication and/or information. The authentication and/or identification may be dynamic based on how confident that the merchant is in the validity of the transaction and the identification of user 102 as the party initiating the purchase request for the transaction, as discussed herein. Thus, based on information provided by user 102 using browser module 120 and/or other applications 114, the required authentication may be adjustable.

In various embodiments, one or more features of browser module 120 and/or payment module 112 may be incorporated in the same module so as to provide their respective features in one module.

Communication device 110 includes other applications 114 as may be desired in particular embodiments to provide features to communication device 110. For example, other applications 114 may include security applications for implementing client-side security features, programmatic client applications for interfacing with appropriate application programming interfaces (APIs) over network 160, or other types of applications. Other applications 114 may also include email, texting, voice and IM applications that allow a user to send and receive emails, calls, texts, and other notifications through network 160, for example, to user 104. In various embodiments, other applications 114 may include financial applications, such as banking, online payments, money transfer, or other applications associated with merchant server 140. Other applications 114 may include browser, social networking, and/or mapping applications where not provided in one or more of browser module 120 and/or payment module 112. Other applications 114 may be utilized to provide user 102's information to merchant server 140 for use in determining a confidence rating in a transaction. Various applications, features, and/or processes of other applications 114 may be used in conjunction with browser module 120 and/or payment module 112. Other applications 114 may contain software programs, executable by a processor, including a graphical user interface (GUI) configured to provide an interface to the user.

Communication device 110 may further include database 116 which may include, for example, identifiers such as operating system registry entries, cookies associated with browser module 120, payment module 112, and/or other applications 114, identifiers associated with hardware of communication device 110, or other appropriate identifiers, such as identifiers used for payment/user/device authentication or identification. Identifiers in database 116 may be used by a payment/credit provider, such as merchant server 140, to associate communication device 110 with a particular account maintained by the payment/credit provider. The identifiers may also be used by a merchant, such as merchant device 130 to identify user 102 and/or a merchant account with the merchant. Database 116 may include information provided to merchant server 140, such as a user location, biometric, or other information used to identify user 102. Additionally, payment request information may be stored to database 116, such as the item(s) in a transaction and/or payment instruments used to provide payment for the transaction.

Communication device 110 includes at least one communication module 118 adapted to communicate with merchant device 130 and/or merchant server 140. In various embodiments, communication module 118 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices.

Merchant device 130 may be maintained, for example, by a merchant, which may offer one or more items and/or services for purchase through a merchant location and/or merchant marketplace. In this regard, merchant device 130 includes one or more processing applications which may be configured to interact with communication device 110 and/or merchant server to facilitate generation of a transaction for one or more items and payment for the transaction using a payment request having a payment instrument for user 102. In various embodiments, merchant device 130 may correspond to merchant device at a physical location that offers one or more items for purchase. Additionally, merchant device 130 may be associated with merchant server 140, which a user (e.g., user 102) may access to view the items available for sale. Thus, merchant device 130 may be maintained by or include any merchant, including merchants that offer offline sales of items and/or services through merchant locations. In such embodiments, merchant device 130 may be implemented as a personal computer (PC), a smart phone, laptop computer, wristwatch with appropriate computer hardware resources, eyeglasses with appropriate computer hardware (e.g. GOOGLE GLASS®) and/or other types of computing devices capable of transmitting and/or receiving data, such as an IPAD® from APPLE®. Although only a single merchant device is shown, a plurality of merchant devices may function similarly.

Merchant device 130 of FIG. 1 contains a sales module 132, other applications 134, a database 136, and a communication module 138. Sales module 132 and other applications 134 may correspond to processes, procedures, and/or applications, for example, a software program, executable by a hardware processor. In other embodiments, merchant device 130 may include additional or different modules having specialized hardware and/or software as required.

Sales module 132 may correspond to one or more processes to execute modules and associated specialized hardware of communication device 110 to provide a merchant sales interface permitting a merchant or merchant employee to generate a transaction for one or more items selected by user 102 for purchase and process a purchase request for the transaction. In this regard, sales module 132 may correspond to specialized hardware and/or software to access and/or receive item information for use in generating a transaction with the merchant associated with merchant device 130 and merchant server 140. For example, in certain embodiments, sales module 132 may receive input for the item, such as a scan of a barcode, entry of an inventory number, etc. After selecting items for purchase, payment module 112 and/or sales module 132 may generate a transaction for the selected item(s), as discussed herein, for example, by gathering the item(s)/service(s) into a shopping basket and providing a checkout interface for completion of the transaction. The checkout interface may include an option for user 102 to provide payment for the transaction, for example, using payment module 112 by submitting a purchase request to sales module 132 (e.g., through a payment account or payment card, where payment module 112 has information necessary to provide payment through the payment instrument). In other embodiments, user 102 may provide the payment instrument to merchant device 130 (e.g., a physical payment card or entry of a login to a payment account), where sales module 132 generates the purchase request with the submitted payment instrument.

Once a purchase request is generated, sales module 132 may utilize the purchase request to process a payment for the transaction (e.g., a payment to the merchant for merchant device 130 and merchant server 140). Sales module 132 may also receive a confidence rating and/or required authentication information in order to process the transaction. Merchant server 140 may determine the confidence rating and the required authentication information received during processing of the purchase request. User 102 may enter the required authentication information to merchant device 130 and/or a merchant or merchant employee may enter the required authentication information, such as in an interface of sales module 132. If the required authentication information is incorrect or unavailable, sales module 132 may prevent processing of the purchase request.

In various embodiments, merchant device 130 includes other applications 134 as may be desired in particular embodiments to provide features to merchant device 130. For example, other applications 134 may include security applications for implementing client-side security features, programmatic client applications for interfacing with appropriate application programming interfaces (APIs) over network 160, or other types of applications. Other applications 134 may contain software programs, executable by a processor, including a graphical user interface (GUI), configured to provide an interface to a user of merchant device 130 (e.g., a merchant or merchant employee). In various embodiments where not provided by sales module 132, merchant device 130 may include communication applications, such as messaging, phone, email, or other applications for use in contacting user 104.

Additionally, merchant device 130 includes database 136. User 102 may establish one or more merchant accounts with merchant server 140 that may provide user information to merchant device 130. User accounts in database 136 may include a name, address, birthdate, payment/funding information, additional user financial information, and/or other desired user data. User 102 may link to their account(s) through a user and/or device identifier. In other embodiments, user 102 may not have previously established an account and may provide other information to merchant device 130 to generate and/or complete financial transactions, as previously discussed. Database 136 may further include item information used by payment module 120 and/or sales module 132 to generate a transaction, such as item information, pricing, merchant application interface components, and/or merchant information. Database 136 may further include purchase requests for the transaction, which may be communicated to merchant server 140 for determination of a confidence rating having required authentication during processing of a payment instrument in the purchase request. Merchant device may receive the confidence rating and the required authentication from merchant server 140, which may be stored to database 136. Additionally, received authentication information from user 102 or another user may be stored to database 136 for processing and determination of whether actions by the user in a transaction are fraudulent.

In various embodiments, merchant device 130 includes at least one communication module 138 adapted to communicate communication device 110 and/or merchant server 140 over network 160. In various embodiments, communication module 138 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Merchant server 140 may be maintained, for example, by a merchant offering sale of one or more items to user 102 through a merchant location associated with merchant device 130 and/or through an online marketplace (e.g., viewable using communication device 110). In this regard, merchant server 140 includes one or more processing applications which may be configured to interact with communication device 110 and/or merchant device 130 to offer items for purchase from a marketplace and receive purchase requests for items at the merchant location. When receiving the purchase request, merchant server 140 may further determine a confidence rating in the validity of the transaction, such that merchant server 140 may determine required authentication for processing of a payment instrument in the transaction. For example, merchant device 130 may be provided by EBAY®, Inc. of San Jose, CA, USA or STUBHUB®, Inc. of San Francisco, CA. However, in other embodiments, merchant server 140 may correspond to any online and/or offline merchant. Although a single merchant server is shown, a plurality of merchant servers may function similarly. Additionally, although merchant server 140 is shown as a server remote from merchant location 130, in other embodiments the described processes and functions of merchant server 140 may be included in one or more of merchant device 130 that is local to merchant location 130.

Merchant server 140 of FIG. 1 includes a merchant marketplace module 142, a database 146, and a communication module 148. Merchant marketplace module 142 may correspond to executable processes, procedures, and/or applications with associated hardware. In other embodiments, merchant server 140 may include additional or different modules having specialized hardware and/or software as required.

Merchant marketplace module 142 may correspond to one or more processes to execute modules and associated specialized hardware of merchant server 140 to provide an online merchant marketplace where user 102 may browse items (e.g., goods, products, and/or services, herein referred to as an "item" or "items") for sale from a merchant associated with merchant device 130 and merchant server 140. In this regard, merchant marketplace module 142 may correspond to specialized hardware and/or software utilized to provide a marketplace interface having searchable item sale offers, such as a page where a user may view an item and item information, reserve the item for purchase, and/or place the item into a digital shopping cart or wish list. User 102 may utilize the marketplace interface provided by merchant marketplace module 142 to register intent to purchase an item through user 102's actions. Thus, an indication that user 102 intends to purchase an item may correspond to a search of the item, viewing a sale offer for the item, a selection of the item, reservation of the item, placing the item in a wish list or digital shopping cart, and/or entering a time to purchase and pick up the item at a merchant location.

The indication may accompany information user 102 provides to merchant marketplace module 142 in order to identify user 102. The information provided by user 102 may correspond to a login for an account, a password or PIN, a biometric input/reading, a location of the user, identifiers associated with the user, and network connections by the user. The information may also be presented during checkout at the merchant location associated with merchant device 130. The information may be received prior to user 102 communicating the indication to merchant server 140, such as in a user account for user 102. The information may also be changed and/or updated prior to user 102 attempting to purchase the item at the merchant location. For example, user 102 may enter a new password or updated biometric reading from a trusted source to change the information. User 102 may also enter further indications that user 102 intends to purchase the item, such as another search and viewing of the item on the merchant marketplace, which may include new information (e.g., a new time for pick-up of the item, a new PIN or password, etc.). Merchant marketplace module 142 may assist one or more users in purchase and payment for items in the online marketplace. However, user 102 may not purchase the item through the marketplace offered by merchant marketplace 142. Instead, user 102 may visit a merchant location in order to complete the transaction, where user confidence module 150 determines a confidence rating in a purchase request for the transaction, such as a likelihood that the transaction is valid and what authentication and/or identification is required by user 102 to process the purchase request (and payment using the payment instrument in the purchase request).

Thus, user confidence module 150 may correspond to one or more processes to execute modules and associated specialized hardware of merchant server 140 to access user indications of intent to purchase an item, information used to identify a user, user actions since indicating an intent to purchase the item, and to determine a confidence rating for a purchase request for the item using the aforementioned information. In this regard, user confidence module 150 may correspond to specialized hardware and/or software utilized to access user indications of intent to purchase an item received from user 102 when user 102 accesses the marketplace provided by merchant marketplace module 142. User confidence module 150 may further access information for user 102, such as information in a user account and/or submitted by user 102 with the indication to purchase the item. User confidence module 150 may utilize the aforementioned indication and information to determine a confidence rating when user confidence module 150 receives a purchase request for a transaction having the item. The purchase request may be received from merchant device 130, such as when a user is attempting to purchase an item at a merchant location. User confidence module 150 may determine the purchase request matches the indication and/or information using a payment instrument in the purchase request. Thus, user confidence module 150 may determine whether the indication and item in the indication matches the item in the purchase request. Further user confidence module 150 may determine whether the information about user 102 matches either information in the purchase request and/or information submitted by user 102 at the merchant location (e.g., a biometric reading for user 102, a PIN provided by the user, a user device identifier detected through a WiFi connection at the merchant location, etc.).

If the purchase request and/or purchase request information matches the indication and/or the user information, user confidence module 150 may determine that the merchant has a high confidence rating for the purchase request, and that required authentication to complete a payment using the payment instrument in the purchase request is little or none. Thus, user 102 may complete the transaction quickly and without filling out forms or going through lengthy merchant checkout processes. However, if the purchase request includes a different item, or if information about user 102 and the user initiate the purchase request don't match (e.g., a different biometric reading, detection of communication device 110 as remote from the merchant location, etc.), the user confidence module 150 may have a low confidence rating in the transaction. User confidence module 150 may prevent payment for the transaction and/or may require increased authentication and/or identification that the user generating the transaction for the item and submitting the purchase request having user 102's payment instrument is actually user 102 (e.g., and not a fraudulent user misappropriating user 102's identity).

The confidence rating and/or the required authentication and identification may be dynamic where additional information is accrued between the indication to purchase an item by user 102 and receiving the purchase request at the merchant location by user confidence module 150. For example, additional information, such as a location for user 102 and/or communication device 110, a travel route by user 102, network connections by communication device 110, a time the purchase request is submitted to merchant device 130, user logins to a user account, PIN numbers provided by user 102, passwords provided by user 102, and/or biometric input/readings by user 102. If actions taken by user 102 indicate an identity confirmation by user 102 (e.g., travelling from a home address to the merchant location as identified through a GPS unit, entry of the same biometric at a bank for user 102, etc.), the confidence rating may be higher and thus decreased authentication may be required. Conversely, if the actions indicate fraud, user confidence module 150 may have a decreased confidence rating and require additional or heightened authentication.

In various embodiments, merchant server 140 includes other applications 144 as may be desired in particular embodiments to provide features to merchant server 140. For example, other applications 144 may include security applications for implementing server-side security features, programmatic server applications for interfacing with appropriate application programming interfaces (APIs) over network 160, or other types of applications. Other applications 144 may contain software programs, executable by a processor, including a graphical user interface (GUI), configured to provide an interface to a user.

Merchant server 140 includes a database 146. As previously discussed, user 102 may establish one or more merchant accounts with the merchant associated with merchant location 130 and merchant server 140. Merchant accounts in database 146 may include user information, such as name, address, birthdate, payment/funding information, additional user financial information, and/or other desired user data. Merchant accounts may further include item shopping information, loyalty account information, and/or other benefits for user 102. User 102 may link to their merchant account through a user, device, and/or account identifier. Thus, when an identifier is transmitted to merchant server 140, e.g. from communication device 110 and/or merchant device 130, a merchant account belonging to user 102 may be found. In other embodiments, user 102 may not have previously established a merchant account and may provide other financial information to merchant server 140 for use in processing a transaction. Database 146 may also store received indications that user 102 intends to buy an item and information used to identify user 102 (e.g., biometrics, passwords, etc.). Information about user 102 collected after receiving user 102's intent to purchase may be stored to database 146 and used to determine a confidence rating and required authentication. Merchant server 140 may also store received authentication and/or identification for user 102.

In various embodiments, merchant server 140 includes at least one communication module 148 adapted to communicate communication device 110 merchant device 130 over network 160. In various embodiments, network interface component 156 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Network 160 may be implemented as a single network or a combination of multiple networks. For example, in various embodiments, network 160 may include the Internet or one or more intranets, landline networks, wireless networks, and/or other appropriate types of networks. Thus, network 160 may correspond to small scale communication networks, such as a private or local area network, or a larger scale network, such as a wide area network or the Internet, accessible by the various components of system 100.

Figure 2A:
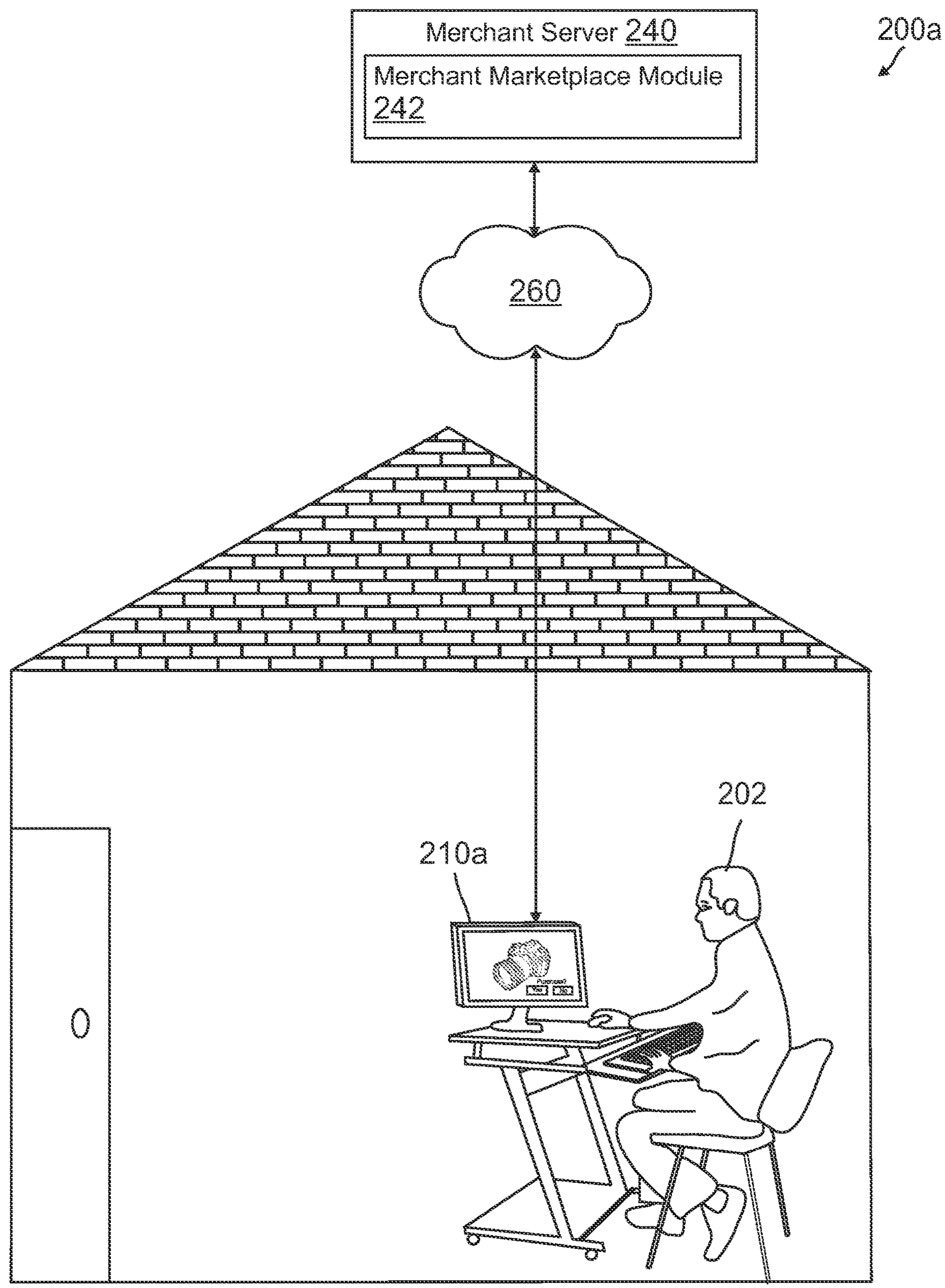
FIG. 2A is an exemplary system environment showing a user providing an indication of intent to purchase an item in an online marketplace, according to an embodiment.

FIG. 2A is an exemplary system environment showing a user providing an indication of intent to purchase an item in an online marketplace, according to an embodiment. Environment 200*a* includes a user 202, a communication device 210*a*, and network 260 corresponding generally to user 102, communication device 110, and network 160, respectively, of FIG. 1. Additionally, environment 200*a* includes a merchant server 240 executing a merchant marketplace module 242 corresponding generally to merchant server 140 executing merchant marketplace module 142, respectively, of FIG. 1.

User 202 may utilize communication device 210*a* to view items available on an online merchant marketplace. Thus, user 202 may utilize communication device 210*a* to access merchant server 240 over network 260 and view the online merchant marketplace provided by merchant marketplace module 242. Merchant marketplace module 242 may provide one or more items for user 202 to browse while view the marketplace. User 202 may find an item of interest, such as the camera displayed on communication device 210*a*. User 202 may indicate a desire to purchase the camera, such as through viewing the camera on the marketplace, reserving the camera, and/or through other actions that indicate that user 202 wishes to purchase the camera. When indicating user 202's desire to purchase the camera, user 202 may provide some information, such as a biometric reading, PIN, password, or other identification. Merchant server 240 may also access the identification from a user account for user 202. The identification may also include a determination that user 202 is at a home location and/or using an associated communication device 210*a* that identifies user 202. Thus, merchant server 240 may receive the indication and information for user 202. However, user 202 may wish to visit a merchant location to purchase the camera, and thus, user 202 may leave environment 200*a* to purchase the camera from a merchant location in environment 200*b* of FIG. 2B.

Figure 2B:
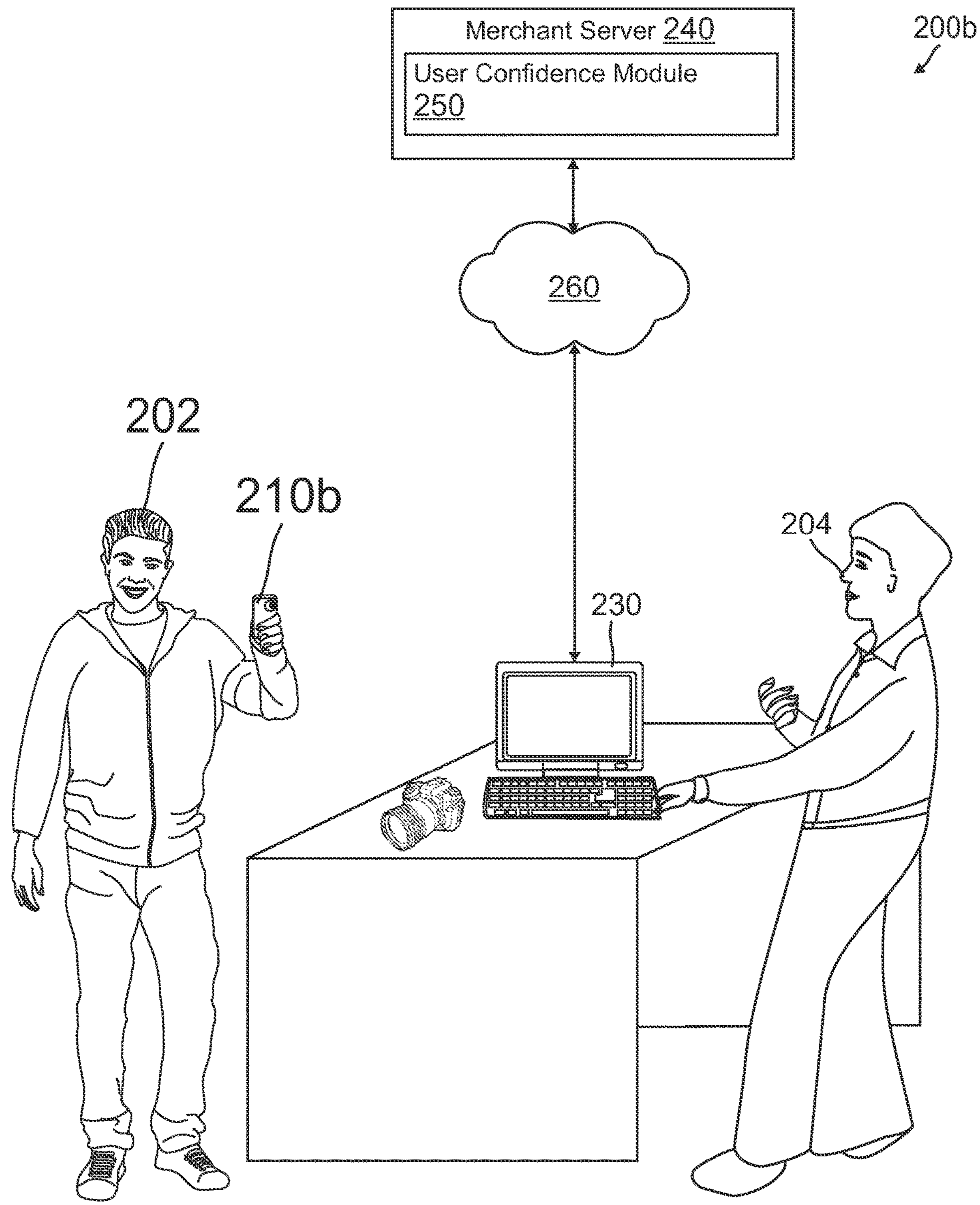
FIG. 2B is an exemplary system environment showing a user arriving at a merchant location to purchase the item and the merchant determining a confidence rating for a purchase request for the transaction for the item, according to an embodiment.

FIG. 2B is an exemplary system environment showing a user arriving at a merchant location to purchase the item and the merchant determining a confidence rating for a purchase request for the transaction for the item, according to an embodiment. Environment 200*b* includes a user 202, a communication device 210*b*, a merchant device 230, and network 260 corresponding generally to user 102, communication device 110, merchant device 130, and network 160, respectively, of FIG. 1. Additionally, environment 200*b* includes a merchant server 240 executing a user confidence module 250 corresponding generally to merchant server 140 executing user confidence module 150, respectively, of FIG. 1.

In environment 200*b*, user 202 visiting a merchant location in order to purchase an item, shown as a camera on a checkout stand of the merchant location. When attempting to purchase the camera, communication device 210*b* and/or merchant device 230 may generate a transaction for the item. For example, a merchant employee 204 may enter the camera into the transaction and request payment from user 202. User 202 may then provide a purchase request for the transaction. The purchase request may include a payment instrument to effectuate a payment to the merchant for the camera, as well as terms of payment or other contingencies associated with payment.

Merchant device 230 may receive the purchase request and communicate the purchase request to merchant server 240 over network 260. Merchant server 240 may utilize user confidence module 250 to determine a confidence rating in the purchase request and, thus, required authentication and/or identification by user 202 to insure payment for the transaction is not fraudulent. As discussed herein, user confidence module 250 may utilize the indication and the information for the user associated with the payment instrument in the purchase request. If the indication and/or information match information in the purchase request (e.g., the indication and item in the purchase request are the same, a biometric provided by user 202 in environment 200*a* of FIG. 2A matches the biometric provided by user 202 to merchant device 230 in environment 200*b* of FIG. 2B), user confidence module 250 may be confident that the purchase request is valid and instruct merchant employee 204 to move forward with the transaction and/or require less authentication and/or identification from user 202. However, if user 202 is attempting to purchase the camera without an associated indication and/or user 202 provided different information to merchant device 230, user confidence module 250 may require merchant employee 204 to request authentication and identification information from user 202 in order to prove user 202 is not acting fraudulently.

Figure 3:
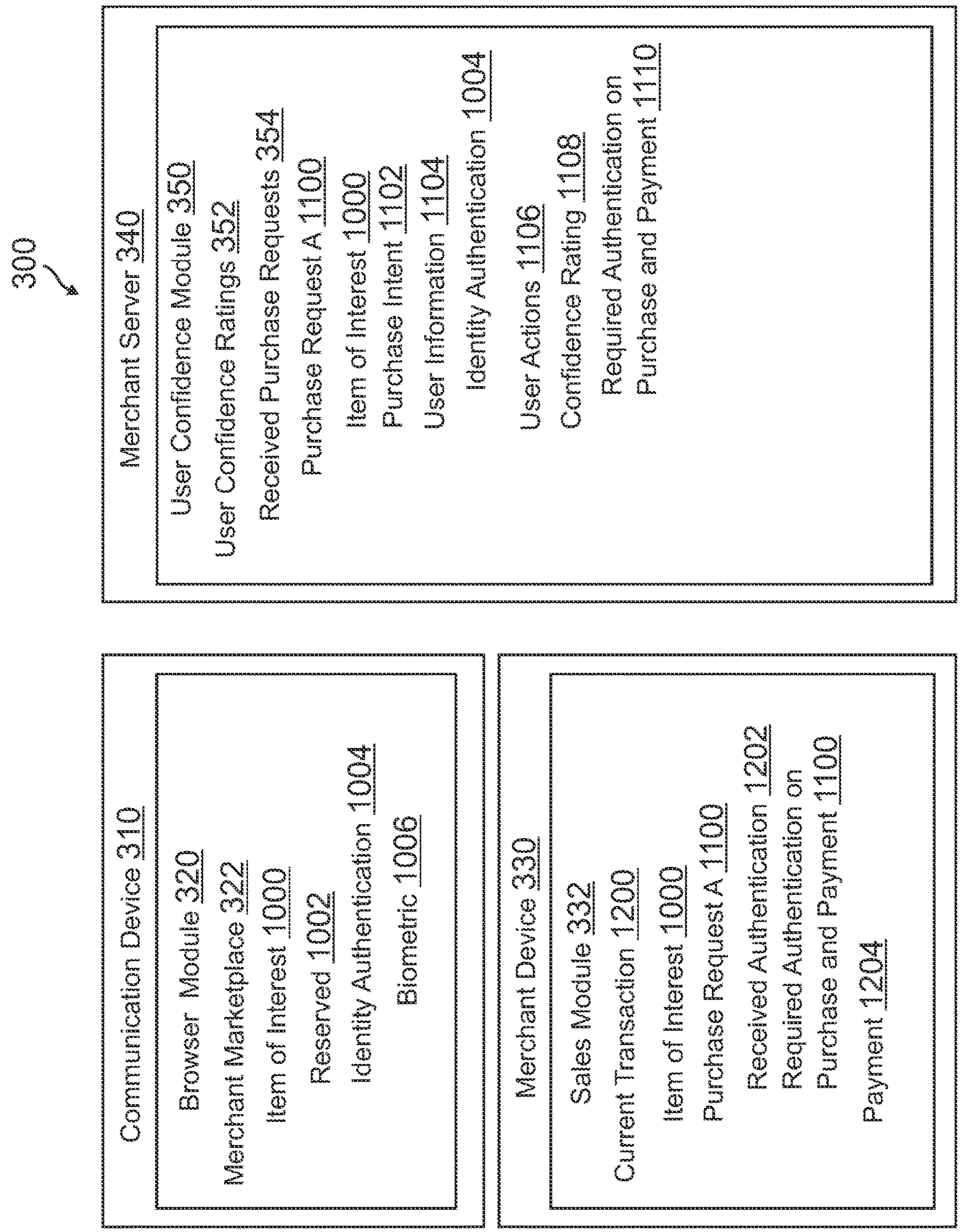
FIG. 3 is an exemplary system environment showing a communication device and merchant device engaged in a transaction for an item and a merchant server determining a confidence rating for a purchase request for said transaction, according to an embodiment.

FIG. 3 is an exemplary system environment showing a communication device and merchant device engaged in a transaction for an item and a merchant server determining a confidence rating for a purchase request for said transaction, according to an embodiment. Environment 300 includes a communication device 310, a merchant device 330, and a merchant server 340 corresponding generally to communication device 110, merchant device 130, and merchant server 140, respectively, of FIG. 1.

Communication device 310 executes a browser module 320 corresponding generally to the specialized hardware and/or software modules and processes described in reference to browser module 120 of FIG. 1. In this regard, browser module 120 may provide an interface where a user (not shown) of communication device 330 may view an online merchant marketplace and register an intent to purchase an item from the merchant. Thus, browser module 320 includes a merchant marketplace 322 having an item of interest 1000. The user may provide an indication of the user's intent to purchase item of interest 1000 through user actions, such as selection of a reserved 1002 option. Moreover, the user may provide information associated with the user, such as personal, login, and/or biometric information as identity authentication 1004, which includes a biometric 1006 in environment 300.

After receiving information from communication device 310, merchant server 340 may store the information to a database. Later, merchant device 330 may generate a transaction, where a purchase request identifying the user of communication device 310 (e.g., through a payment instrument of the user) may be submitted to merchant device 330 to complete payment for the transaction. Merchant device 330 executes a sales module 332 corresponding generally to the specialized hardware and/or software modules and processes described in reference to sales module 132 of FIG. 1. In this regard, sales module 332 includes a current transaction 1200 having item of interest 1000 previously indicated by browser module 1000 that the user desires or intends to purchase. Current transaction 1200 further includes a purchase request A 1100 for the item, which may include received authentication 1202, such as authentication/identification submitted when merchant device 330 is completing the transaction. Merchant server 340 may also determine a confidence rating in the transaction, which may guide what is required under required authentication on purchase and payment. Current transaction 1200 may also include a payment 1204, which may be processed once required authentication on purchase and payment 1100 is completed.

Merchant server 340 may execute user confidence module 350 in order to determine a confidence rating for purchase request A 1100 in transaction 1200 that guides what is required under requited authentication on purchase and payment 1100. Thus, merchant server 340 executes a user confidence module 350 corresponding generally to the specialized hardware and/or software modules and processes described in reference to user confidence module 150 of FIG. 1. In this regard, user confidence module 350 includes user confidence ratings 352 that may be determined when receiving a purchase request for a transaction. Thus, user confidence rating 352 includes received purchase requests 354 having at least purchase request A 1100. User confidence module 350 may process received information, such as item of interest 1000, purchase intent 1102, user information 1104 including identity authentication 1004, and user actions 1106 to determine confidence rating 1108. As discussed herein, confidence rating 1108 may be utilized to guide required authentication on purchase and payment 1110, such that the authentication/identification required during current transaction 1200 may be low when merchant server 340 determines a high confidence rating, and high when merchant server 340 determines a low confidence rating.

Figure 4:
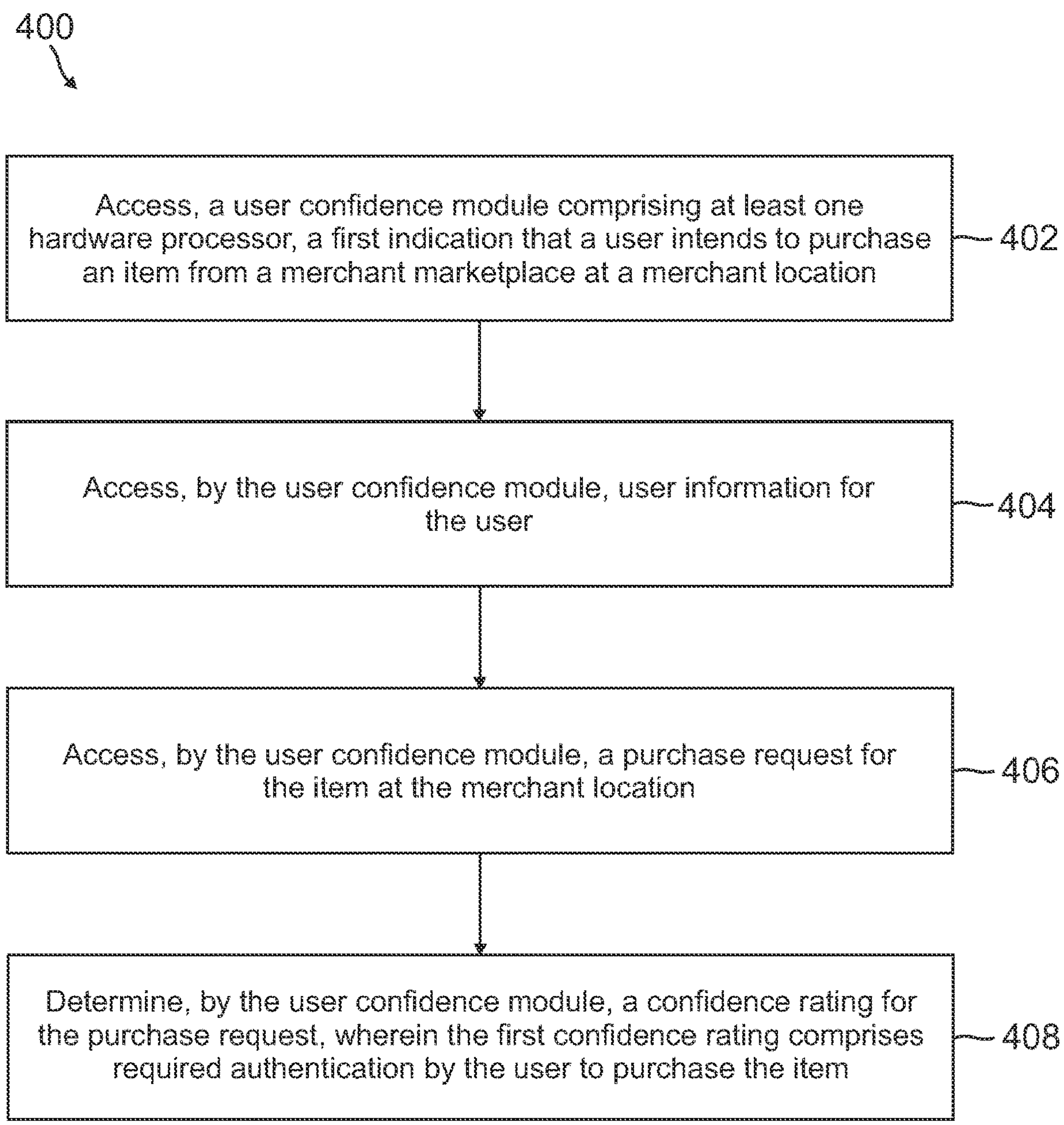
FIG. 4 is a flowchart of an exemplary process for dynamic authentication through user information and intent, according to an embodiment.

FIG. 4 is a flowchart of an exemplary process for dynamic authentication through user information and intent, according to an embodiment. Note that one or more steps, processes, and methods described herein may be omitted, performed in a different sequence, or combined as desired or appropriate.

At step 402, an indication that a first user intends to purchase an item from a merchant marketplace at a first merchant location is accessed, by a user confidence module comprising at least one hardware processor. The indication may comprise one of a search of the item on the merchant marketplace, a selection of the item on an interface for the merchant marketplace, a reservation of the item with a merchant associated with the merchant location, a digital shopping cart for the merchant marketplace comprising the item, a wish list for the merchant marketplace comprising the item, and a time for pickup of the item by the user at the merchant location. The merchant marketplace may comprise at least one of a merchant website and a merchant mobile device application offering the item for sale.

User information for the first user is accessed, by the user confidence module, at step 404. The information may comprise user information in a user account for the user with the merchant marketplace. The information may also comprise user information for the user provided with the first indication, wherein the user information comprises one of a user login, a personal identification number, a password, a biometric reading, a location of the user, a device identifier for the communication device of the user, and a network connection by the communication device of the user. The user information may also be accessed from a database and comprise a user account for the user, an identifier for the user, and a device identifier for the communication device, and wherein the first indication comprises the user information.

At step 406, a purchase request for the item is accessed, by the user confidence module. The purchase request may be received from a merchant device at the first merchant location prior to the accessing the indication in step 402. Thus, at step 408, a confidence rating for the purchase request is determined, by the user confidence module, using the indication and the user information, wherein the confidence rating comprises first required authentication by the first user to purchase the item. The purchase request may comprise a payment instrument of the user, wherein the required authentication comprises authentication or identification information for at least one of the payment instrument and the user required to be presented at the merchant location to purchase the item. In various embodiments, the purchase request may comprise user information provided by the user at the merchant location, wherein the user confidence module determines the confidence rating by determining if at least one the first indication and the first identification match the user information.

A network interface component may receive second information for the user prior to receiving the purchase request, wherein the user confidence module determines the confidence rating further using the second information. The second information may comprise one of a time of arrival at the merchant location, a time of pickup of the item at the merchant location, a travel route of the user, a network connection of the communication device, a user login provided at the merchant location, a personal identification number provided at the merchant location, a password provided at the merchant location, and a biometric reading of the user provided at the merchant location. The user confidence module may determine the confidence rating by determining if at least one of the first indication and the first information is associated with the second information.

The purchase request may comprises second information not matching the first information, wherein the first required authentication comprises at least one of proof of identity for the user and proof of ownership of a payment instrument of the user. In contrast, the first required authentication may comprise a decreased amount of authentication or identification for at least one of the user and a payment instrument of the user if the at least one of the first indication and the first information is associated with the second information. However, the first required authentication may comprise an increased amount of authentication or identification for at least one of the user and a payment instrument of the user if the at least one of the first indication and the first information is not associated with the second information.

In various embodiments, at least one of a second indication that the user intends to purchase the item and second information for the user is received. Thus, the confidence rating may comprise a second required authentication associated with at least one of the second indication and the second information. The purchase request for the item may be at a second merchant location. In such embodiments, the confidence rating is further determined using the second merchant location. The purchase request for the item also may be by a second user. Thus, the confidence rating may further comprise second required authentication by the second user to purchase the item for the first user with a payment instrument for the first user.

Figure 5:
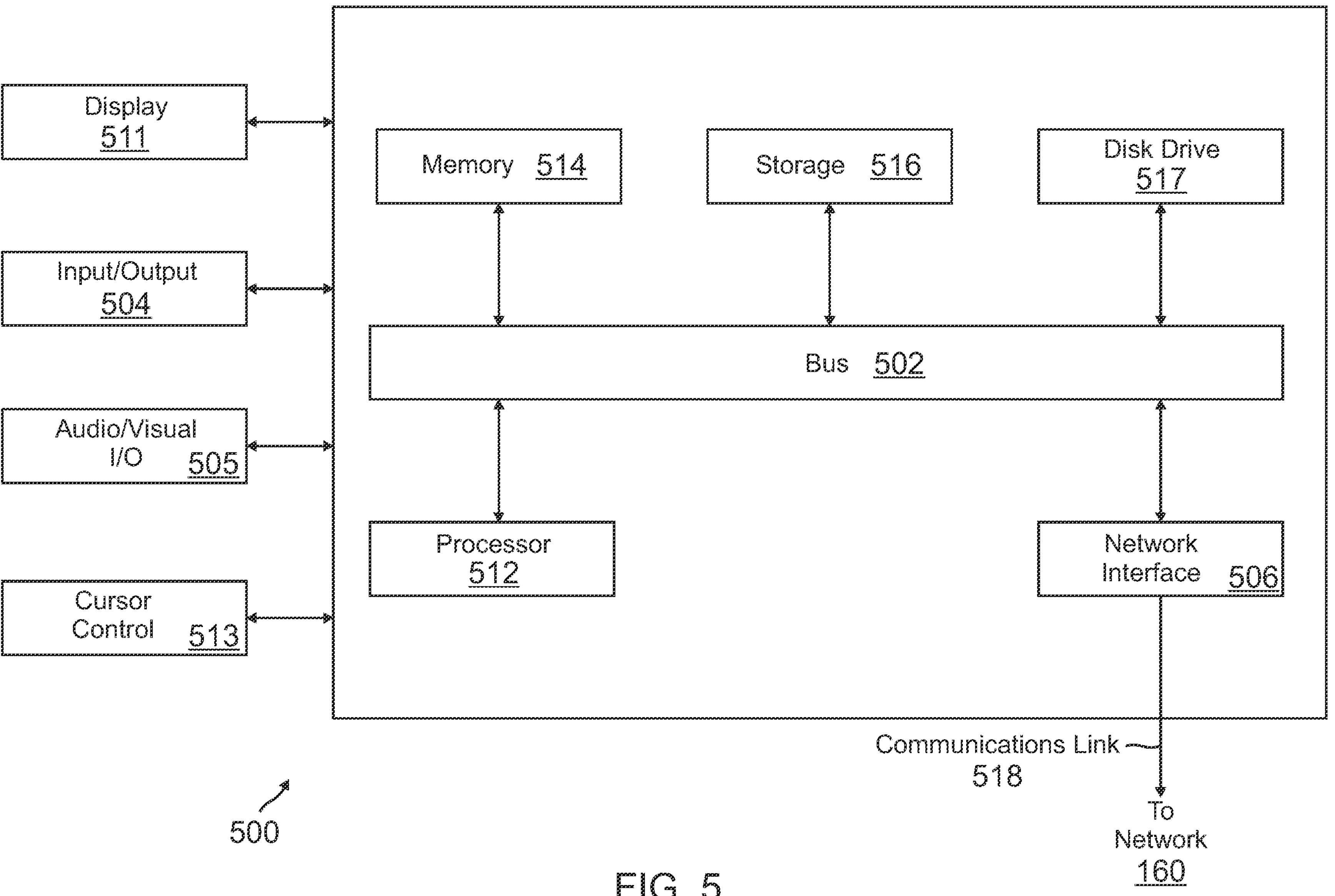
FIG. 5 is a block diagram of a computer system suitable for implementing one or more components in FIG. 1, according to an embodiment.

FIG. 5 is a block diagram of a computer system suitable for implementing one or more components in FIG. 1, according to an embodiment. In various embodiments, the user device may comprise a personal computing device (e.g., smart phone, a computing tablet, a personal computer, laptop, a wearable computing device such as glasses or a watch, Bluetooth device, key FOB, badge, etc.) capable of communicating with the network. The service provider may utilize a network computing device (e.g., a network server) capable of communicating with the network. It should be appreciated that each of the devices utilized by users and service providers may be implemented as computer system 500 in a manner as follows.

Computer system 500 includes a bus 502 or other communication mechanism for communicating information data, signals, and information between various components of computer system 500. Components include an input/output (I/O) component 504 that processes a user action, such as selecting keys from a keypad/keyboard, selecting one or more buttons, image, or links, and/or moving one or more images, etc., and sends a corresponding signal to bus 502. I/O component 504 may also include an output component, such as a display 511 and a cursor control 513 (such as a keyboard, keypad, mouse, etc.). An optional audio input/output component 505 may also be included to allow a user to use voice for inputting information by converting audio signals. Audio I/O component 505 may allow the user to hear audio. A transceiver or network interface 506 transmits and receives signals between computer system 500 and other devices, such as another user device, service device, or a service provider server via network 160. In one embodiment, the transmission is wireless, although other transmission mediums and methods may also be suitable. One or more processors 512, which can be a micro-controller, digital signal processor (DSP), or other processing component, processes these various signals, such as for display on computer system 500 or transmission to other devices via a communication link 518. Processor(s) 512 may also control transmission of information, such as cookies or IP addresses, to other devices.

Components of computer system 500 also include a system memory component 514 (e.g., RAM), a static storage component 516 (e.g., ROM), and/or a disk drive 517. Computer system 500 performs specific operations by processor(s) 512 and other components by executing one or more sequences of instructions contained in system memory component 514. Logic may be encoded in a computer readable medium, which may refer to any medium that participates in providing instructions to processor(s) 512 for execution. Such a medium may take many forms, including but not limited to, non-volatile media, volatile media, and transmission media. In various embodiments, non-volatile media includes optical or magnetic disks, volatile media includes dynamic memory, such as system memory component 514, and transmission media includes coaxial cables, copper wire, and fiber optics, including wires that comprise bus 502. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 500. In various other embodiments of the present disclosure, a plurality of computer systems 500 coupled by communication link 518 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system comprising:

one or more processors; and one or more machine-readable storage media having instructions stored thereon that, in response to being executed by the one or more processors, cause the system to perform operations comprising:

receiving an intent associated with a purchase by a user from a merchant;

receiving, from a merchant device of the merchant, a purchase request for a first item from the merchant using a payment instrument associated with the user;

tracking user behavior of the user during a time period associated with the purchase request;

determining a confidence rating that the user is associated with the purchase request based on the intent and the user behavior, wherein the confidence rating is based at least in part on how much the user behavior deviates from initial information provided for the user;

dynamically adjusting an authentication needed for processing the purchase request using the payment instrument based in part on the confidence rating;

transmitting a request for the authentication needed to the merchant device;

receiving an authentication input associated with the request from the merchant device; and processing a transaction based on the received authentication input.

2. The system of claim 1, wherein the determining the confidence rating includes determining signs of fraud, and wherein the signs of fraud include at least one of past fraudulent transactions, account flags, or atypical items for purchase.

3. The system of claim 1, wherein the confidence rating is further determined based on a biometric requested at a time of purchase.

4. The system of claim 1, wherein determining the confidence rating is further based in part on a receipt of an intent to purchase another item.

5. The system of claim 2, wherein the signs of fraud are associated with a communication device associated with a home GPS location, and wherein the communication device is connected with to a network corresponding to another GPS location different from the home GPS location.

6. The system of claim 1, wherein the operations further comprise:

based on the confidence rating, requiring a type of authentication during the transaction processing.

7. The system of claim 1, wherein, when the confidence rating is increased, a reduced authentication is required to complete the transaction.

8. The system of claim 5, wherein determining the confidence rating includes detecting the communication device is remote from a merchant location, and wherein the confidence rating is decreased based on the detecting.

9. The system of claim 1, wherein the intent is associated with a search for a plurality of items.

10. A method comprising:

receiving an intent associated with a purchase by a user from a merchant;

receiving, from a merchant device of the merchant, a purchase request for a first item from the merchant using a payment instrument associated with the user;

tracking user behavior of the user during a time period associated with the purchase request;

determining a confidence rating that the user is associated with the purchase request based on the intent and the user behavior, wherein the confidence rating is based at least in part on how much the user behavior deviates from initial information provided for the user;

dynamically adjusting an authentication needed for processing the purchase request using the payment instrument based in part on the confidence rating;

transmitting a request for the authentication needed to the merchant device;

receiving an authentication input associated with the request from the merchant device; and processing a transaction based on the received authentication input.

11. The method of claim 10, wherein the determining the confidence rating includes determining signs of fraud, and wherein the signs of fraud include at least one of past fraudulent transactions, account flags, or atypical items for purchase.

12. The method of claim 10, wherein the confidence rating is further determined based on a biometric requested at a time of purchase.

13. The method of claim 10, wherein determining the confidence rating is further based in part on a receipt of an intent to purchase another item.

14. The method of claim 11, wherein the signs of fraud further include an identification of a communication device associated with a home GPS location, and wherein the communication device is connected with a network corresponding to another GPS location different from the home GPS location.

15. The method of claim 10, based on the confidence rating, requiring a type of authentication during the transaction processing.

16. The method of claim 10, wherein, when the confidence rating is increased, a reduced authentication is required to complete the transaction.

17. The method of claim 14, wherein determining the confidence rating includes detecting the communication device is remote from a merchant location, and wherein the confidence rating is decreased based on the detecting.

18. The method of claim 10, wherein the intent is associated with a search for a plurality of items.

19. A non-transitory machine-readable medium having stored thereon machine-readable instructions executable to cause a machine to perform operations comprising:

receiving an intent associated with a purchase by a user from a merchant;

receiving, from a merchant device of the merchant, a purchase request for a first item from the merchant using a payment instrument associated with the user;

tracking user behavior of the user during a time period associated with the purchase request;

determining a confidence rating that the user is associated with the purchase request based on the intent and the user behavior, wherein the confidence rating is based at least in part on how much the user behavior deviates from initial information provided for the user;

dynamically adjusting an authentication needed for processing the purchase request using the payment instrument based in part on the confidence rating;

transmitting a request for the authentication needed to the merchant device;

receiving an authentication input associated with the request from the merchant device; and processing a transaction based on the received authentication input.

20. The non-transitory machine-readable medium of claim 19, wherein the determining the confidence rating includes determining signs of fraud, and wherein the signs of fraud include at least one of past fraudulent transactions, account flags, or atypical items for purchase.

* * * * *